July 3, 1956  R. J. LA PLANTE  2,752,841
LAWN EDGE ATTACHMENT FOR LAWN MOWERS
Filed April 15, 1955  2 Sheets-Sheet 1
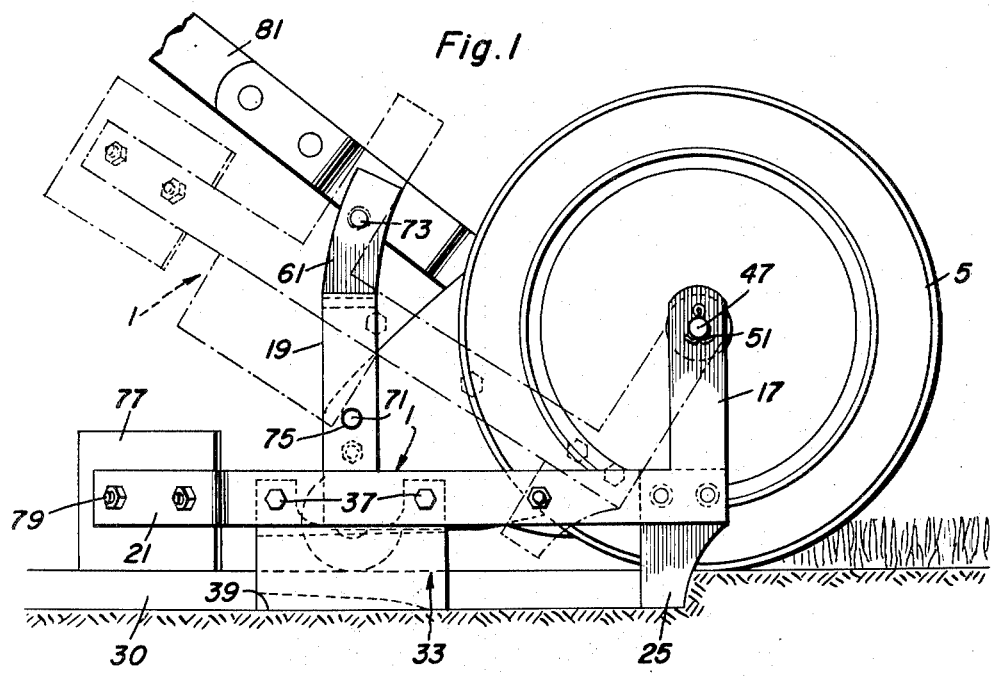
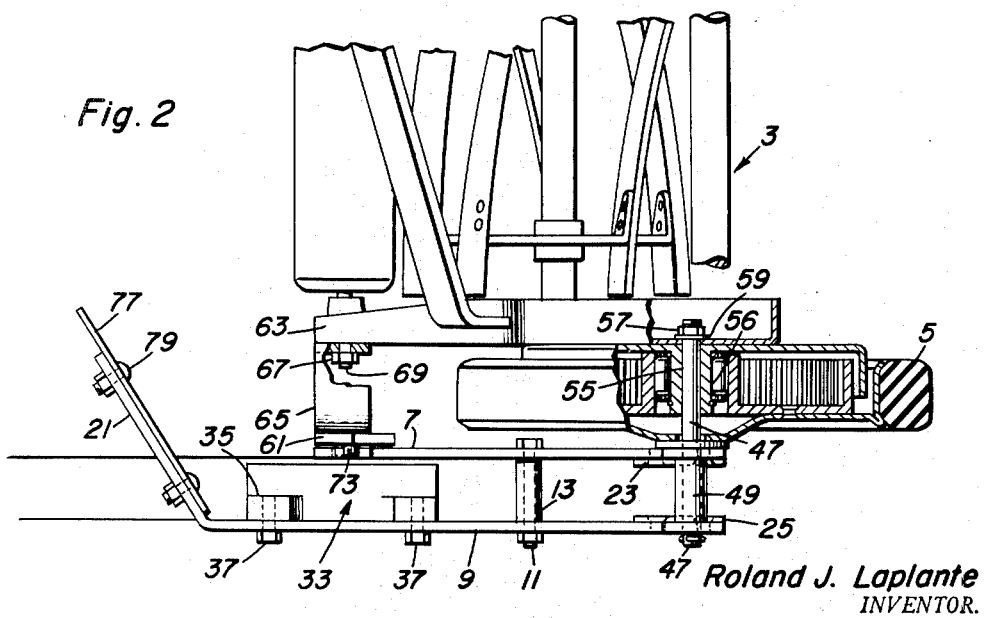
Roland J. Laplante
INVENTOR.

July 3, 1956 R. J. LA PLANTE 2,752,841
LAWN EDGE ATTACHMENT FOR LAWN MOWERS
Filed April 15, 1955 2 Sheets-Sheet 2

Roland J. Laplante
INVENTOR.

BY *[signatures]*
Attorneys

United States Patent Office 2,752,841
Patented July 3, 1956

2,752,841

LAWN EDGE ATTACHMENT FOR LAWN MOWERS

Roland J. La Plante, Portland, Oreg.

Application April 15, 1955, Serial No. 501,485

5 Claims. (Cl. 97—227)

My invention relates to a lawn edging attachment for lawn mowers of the conventional mower reel type.

The primary object of my invention is to provide a practical lawn edger attachable to a lawn mower of the type indicated for propelling thereby and working alongside a wheel thereof to plow a transversely square furrow of uniform depth in a lawn and deflect the dirt and grass plowed out of the furrow to one side of the furrow all without increasing the load on an operator.

Another object is to provide a lawn edger for the above purposes attachable to the lawn mower for swinging into working and idle positions and means for retaining the edger in either position so that the lawn edger may be used when desired or the lawn mower be used alone without detaching the lawn edger.

Still another object is to provide in such a lawn edger improved means for forming the furrow by cutting the sides first and then plowing the ground between the sides so that the edger is easy to operate by an operator pushing the lawn mower and a clean cut furrow is formed.

Still another object is to provide a lawn edger for the purposes specified which is attachable to the conventional pusher type lawn mower easily and quickly, will not readily get out of order and is inexpensive to manufacture and service.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary view in side elevation of my improved lawn edger in a preferred embodiment thereof attached to a lawn mower the lawn edger being shown in full lines in working position and in broken lines in idle position;

Figure 2 is a fragmentary view in plan partly in section;

Figure 3:
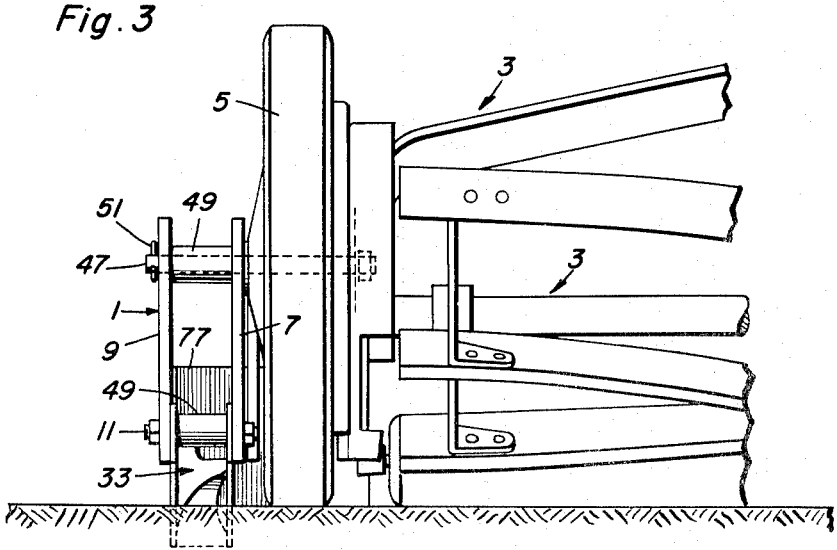
Figure 3 is a fragmentary view in front elevation.
Figure 4:
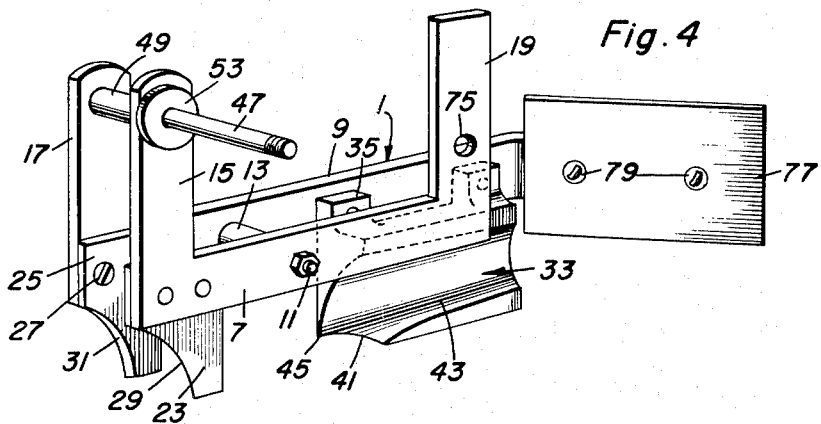
Figure 4 is an enlarged view in perspective of the lawn edger detached.
Figure 5:
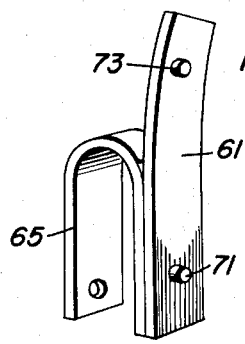

Figure 5 an enlarged fragmentary view in perspective of parts of the retaining means.

Referring to the drawings by numerals my improved lawn edger comprises an elongated frame designated generally by the numeral 1 and which is adapted to be attached to a lawn mower 3 to extend outwardly of and alongside one of the wheels, preferably the right hand wheel 5.

The frame 1 comprises a pair of laterally spaced inboard and outboard side bars 7, 9 of resilient metal secured together intermediate the ends thereof, side-by-side, by means of a transverse bolt 11 and a spacing sleeve 13. The bars 7, 9 are provided with opposite upstanding front end legs 15, 17. The inboard bar is provided with a rear upstanding leg 19 and the outboard bar 9 is provided with a lateral oblique rear end portion 21 inclining rearwardly across said frame 1 and all for a purpose presently seen.

A pair of cutter blades 23, 25 depend from the front ends of the bars 7, 9 on the inner sides thereof and are mounted thereon in opposite laterally spaced relation by screws 27. The cutter blades 23, 25 are provided below the bars 7, 9 with concave beveled front cutting edges 29, 31 and are designed to cut the sides of the furrow when the frame 1 is pushed forwardly by the lawn mower.

A substantially rectangular plow member 33 is interposed between the bars 7, 9 forwardly of the rear end portion 21 of the outboard bar 9 and which is mounted on the outboard bar 9 by upstanding lugs 35 on said member 33 secured to said bar 9 by bolts 37. The plow member 33 is of substantially the same width as the space between the cutter blades 23, 25, extends endwise along the outboard bar 9 and rearwardly of the inboard bar 7, and depends below said bars 7, 9 substantially the same distance as the blades 23, 24 and is provided with a flat bottom 39. Also the plow member 33 is provided at its bottom 39 and front end with an oblique transverse cutting edge 41 and with a longitudinal groove 43 in its inboard side extending from end to end of the member and which is oblique to the vertical plane of said member and forms a moldboard portion on said plow merging with the cutting edge 41 to form a plow point 45. As will be seen the plow member is spaced behind the cutter blades 23, 25 to trail the same.

The frame 1 is mounted at its front end on the lawn mower 3 by the following means. A spindle 47 extends transversely through the upper ends of the legs 15, 17 with an enlarged portion 49 thereon extending between said legs. The legs 15, 17 pivot on the spindle 47 between a cotter pin 51 in the outer end of the spindle and a collar 53 fastened on said spindle. The spindle 47 is inserted in the usual axial bore 55 for the bolt, not shown, that secures the wheel 5 in place on its wheel mounting 56. A nut 57 on the spindle 47 backed by a washer 59 holds the spindle 47 in said bore so that the frame 1 extends rearwardly of the wheel 3 alongside the same and is vertically swingable on said spindle into lowered and raised positions, respectively. The cotter pin holds the frame 1 on the spindle 47. The collar 50 on the spindle 47 holds the wheel 5 on its mounting 56.

The frame 1 is retained in lowered and raised positions by latching means as follows. A vertical support bar 61 for said frame 1 is secured to the side frame member 63 of the lawn mower 3 nearest the wheel 5 and in the rear of said wheel by a U-bracket 65 to one side of which said support bar 61 is suitably fixed and which has its opposite side secured by a nut 67 on a lateral stud 69 on the frame member 63 to which the usual grass catcher, not shown, is attached. A pair of lower and upper lateral studs 71, 73 extend outwardly from said bar 61. An aperture 75 for receiving said studs 71, 73 is provided in the rear leg 19 of the inboard bar 7. In the lowered and raised positions of the frame 1 it may be sprung outwardly on the spindle 47 to react inwardly and snap the lower or upper studs 71, 73 into the aperture 75 to latch said frame 1 in lowered and raised positions.

A rectangular soil scraper blade 77 is bolted as at 79 to the front side of the rear end portion 21 of the outboard bar 9 in the rear of the plow member 33 to incline rearwardly from and across said member 33 and across a furrow formed by the cutter blades 29, 31 and said member 33.

The operation of my lawn edger will be readily understood. When the frame 1 is lowered and latched in substantially horizontal working position as shown in Figure 1 in full lines, the cutter blades 23, 25 and plow member 33 will be positioned below the wheel 5 so that when the lawn mover 3 is propelled, as by the handle 81, or a motor, if motor driven, the cutter blades 23, 25 will score and cut into the ground to form straight sides of a furrow 30 and the plow member 33 will plow out the furrow between said cutter blades 29, 31 and throw the soil upwardly and inwardly toward the path of travel of the law mower. The scraper blade 77 will scrape the soil and deflect the same into the path of travel of the lawn mower. When frame 1 is swung upwardly into the raised dotted line position shown in Figure 1, and latched in that position the cutter blades 23, 24, the plow member 33 and the scraper blade 77 will be raised into idle position so that the lawn mower may be used alone. As will be seen the cutter blades 23, 25 and plow members 33 provide for cutting a clean trench or groove in a lawn along the edges of walks or curbing.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A lawn edger comprising a vertical frame having front and rear ends, means pivotally attaching the frame at its front end to a lawn mower alongside and outwardly of a ground wheel of the lawn mower for vertical swinging about the axis of the wheel upwardly and downwardly and for propelling by the lawn mower, a pair of laterally spaced cutter blades depending from the front end of the frame for cutting into the soil to form the sides of a furrow, a plow member carried by said frame at its rear end for plowing up soil between the cutter blades and deflecting the plowed up soil to one side of the furrow, said blades and plow member being lowered and raised into working and idle positions by swinging of said frame downwardly and upwardly, and coacting latching means on said lawn mower and frame for retaining the frame in raised and lowered positions.

2. A lawn edger as in claim 1, and a scraper blade carried by said frame in the rear of said plow member for deflecting the plowed up soil toward the lawn mower.

3. A lawn edger as in claim 1, said blades having concave front cutting edges.

4. A lawn edger as in claim 1, said plow member being substantially rectangular having at one end an oblique cutting edge and a longitudinal side groove forming a moldboard portion on said member.

5. A lawn edger as in claim 1, said coacting latching means comprising a vertical support bar secured to the lawn mower and having lower and upper lateral studs thereon, and an upright leg on the rear end of said frame having an aperture therein engageable with the lower and upper studs in the working and idle positions of said frame.

References Cited in the file of this patent

UNITED STATES PATENTS

| | | |
|---|---|---|
| 859,263 | Thomassen et al. | July 9, 1907 |
| 1,006,758 | Karass | Oct. 24, 1911 |
| 1,065,946 | Janson | July 1, 1913 |
| 1,249,385 | Hamman | Dec. 11, 1917 |
| 1,720,169 | Cripe | July 9, 1929 |
| 1,911,278 | Hines | May 30, 1933 |
| 2,682,825 | Warholoski | July 6, 1954 |